W. Weaver,
Carpet Stretcher,
N° 64,387. Patented Apr. 30, 1867.
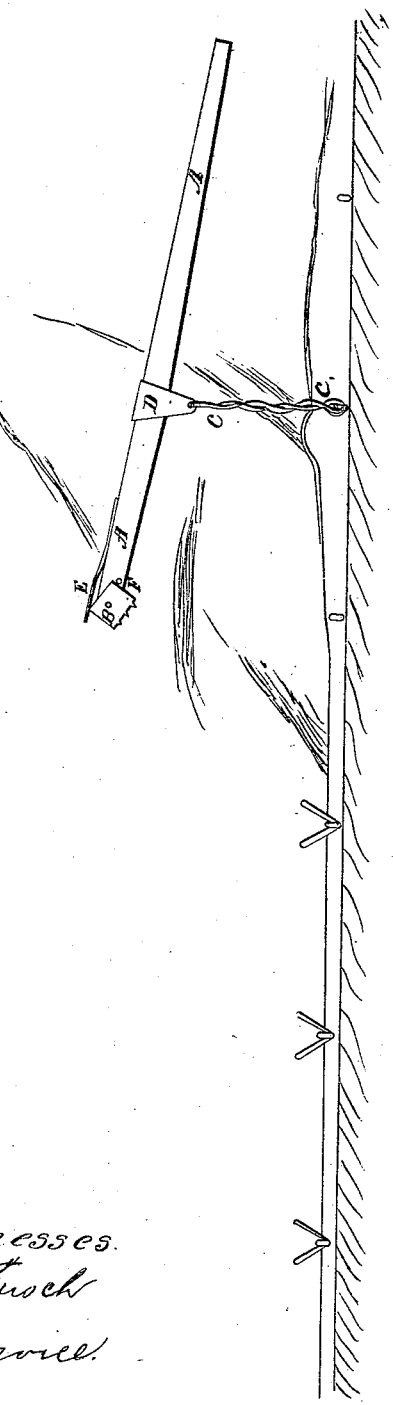
Witnesses
Theo Tusch
J. A. Service
Inventor
W. Weaver
By Munn & Co
Attorneys

United States Patent Office.

WILLIS WEAVER, OF SALEM, OHIO.

Letters Patent No. 64,387, dated April 30, 1867.

IMPROVED CARPET-STRETCHER.

*The Schedule referred to in these Letters Patent and making part of the same.*

TO ALL WHOM IT MAY CONCERN:

Be it known that I, WILLIS WEAVER, of Salem, in the county of Columbiana, and State of Ohio, have invented a new and useful Improvement in Carpet-Stretcher; and I do hereby declare that the following is a full, clear, and exact description thereof, which will enable others skilled in the art to make and use the same, reference being had to the accompanying drawings, forming part of this specification, in which—

Figure 1 is a side view of my improved carpet-stretcher, and illustrating in red lines the manner in which it is to be used.

Figure 2 is an edge view of the same, the wire loop being removed.

Figures 3 and 4 are detail views of the nail and hooked loop by means of which the carpet is secured in place.

Similar letters of reference indicate like parts.

My invention has for its object to furnish a simple and convenient instrument for stretching carpets upon the floor, so that they may be conveniently secured in place; and it consists in the combination of a pivoted toothed plate, pivoted wire loop or equivalent, and a lever, with each other, and in the combination of a spring with the lever and pivoted toothed plate; the whole being constructed and arranged as hereinafter more fully described.

A is a lever or bar, to the end of which is pivoted a toothed plate, B. The plate B may be a flat plate having teeth upon one edge, and being pivoted to one or both sides of the end of the bar or lever A; or it may be bent over so as to pass around said end and be pivoted to both sides of said lever, as shown in the drawings. This plate B is pivoted to the lever A, so that while being used it may not twist the carpet. C is a wire loop, the ends of which are pivoted to the bar or lever A by being connected to the plate D, securely attached to the said lever A, as shown in the drawings; or it may be pivoted to said lever in any convenient manner. The loop C may be formed of twisted wire, as shown in fig. 1, or it may be a straight wire bar or rod, having a loop formed upon one end, and the other end pivoted to the lever A, as before described. E is a spring, one end of which is attached to the lever A, and the other end rests upon the rear edge of the plate B to hold it forward in proper position for taking hold of the carpet. The play of the plate B upon its pivoting point may be limited by a stop-pin, F, if desired, as shown in fig. 1.

In using the instrument, the loop C is placed over one of the nails or tacks to which the carpet is to be secured. The free end or handle of the lever A is then brought close to the wall of the room, and the teeth of the plate B inserted in the carpet. By drawing the handle of the lever away from the wall, the carpet will be drawn up or stretched, and may be secured by passing the fastener over the nail with one hand, while the lever is held with the other; or the carpet may be secured in any other convenient manner. It should be observed that the loop C may be pivoted to the end of the lever A, and the plate B pivoted near its middle part. This construction will bring less strain upon the nail over which the loop C is placed, but will make the instrument less convenient for operating near the corners of the room.

What I claim as new, and desire to secure by Letters Patent, is—

1. An improved carpet-stretcher formed by the combination of the pivoted toothed plate B, pivoted wire loop C or equivalent, and the lever A, with each other, substantially as herein shown and described.

2. The combination of the spring E with the pivoted toothed plate B, and lever A substantially as herein shown and described and for the purpose set forth.

WILLIS WEAVER.

Witnesses:
LUCIEN L. GILBERT,
RICH'D G. HEATON.